Aug. 26, 1952     J. J. DIGBY     2,608,100

ENGINE STARTER GEARING

Filed Dec. 18, 1950

WITNESS:
Esther M. Stockton

INVENTOR.
James J. Digby
BY
Clinton S. Janes
ATTORNEY

Patented Aug. 26, 1952

2,608,100

UNITED STATES PATENT OFFICE 2,608,100

ENGINE STARTER GEARING

James J. Digby, Elmira, N. Y., assignor to Bendix Aviation Corporation, Elmira Heights, N. Y., a corporation of Delaware Application December 18, 1950, Serial No. 201,262

5 Claims. (Cl. 74—7)

1

The present invention relates to engine starter gearing, and more particularly to that type in which a drive pinion is automatically traversed into and out of mesh with a gear of an engine to be started.

It is an object of the present invention to provide a novel starter drive incorporating means controlled by the speed of the engine for delaying the demeshing of the drive pinion from the engine gear.

It is another object to provide such a device incorporating a clutch which permits the pinion to overrun freely when the engine starts.

It is another object to provide such a device in which the members of the overrunning clutch are clamped tightly together during the cranking operation.

Figure 1:
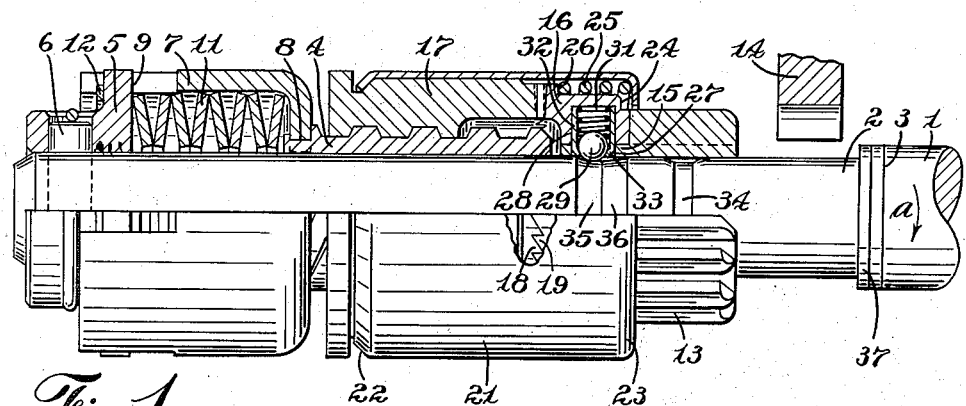
Figure 2:
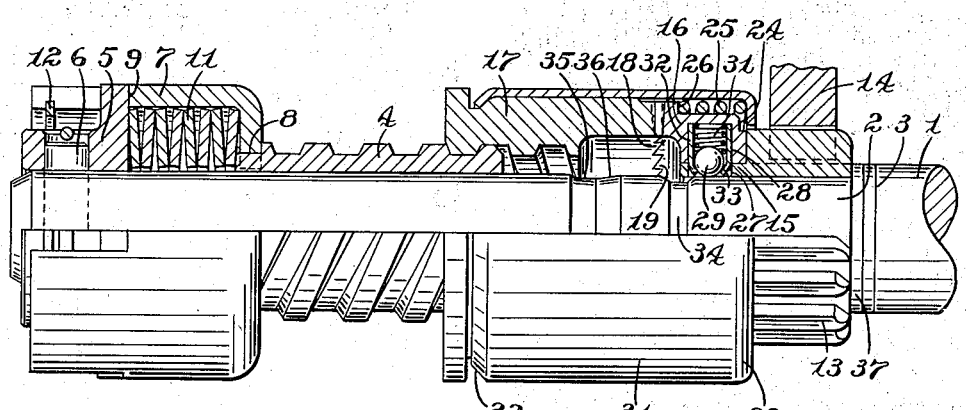

Further objects and advantages may be apparent from the following description taken in connection with the accompanying drawing in which;

Fig. 1 is a side elevation partly broken away and in section showing a preferred embodiment of the invention; and Fig. 2 is a similar view showing the parts in cranking position.

In Fig. 1 of the drawing there is illustrated a power shaft 1 having an extended portion 2 of reduced diameter providing a stop shoulder 3. A hollow screw shaft 4 is slidably journalled on the reduced portion 2 of the power shaft, and means are provided for rotating the screw shaft from the power shaft and for limiting the longitudinal movement of the screw shaft on the power shaft, comprising a driving head 5 fixed on the power shaft as by means of a cross pin 6, a barrel member 7 fixed to the adjacent end of the screw shaft 4 as indicated at 8 and having a splined connection with the driving head 5 as shown at 9; and a plurality of dished spring washers 11 retained under a slight initial compression by a lock ring 12 seated in the barrel 7 and normally bearing against the driving head 5.

A pinion 13 is slidably journalled on the reduced portion 2 of the power shaft for longitudinal movement into and out of mesh with a gear 14 of the engine to be started.

Pinion 13 has an extended hub 15 on which is rigidly mounted in any suitable manner a driven overrunning clutch member 16. A control nut 17 is threaded on the screw shaft 4, and is provided with overrunning clutch teeth 18 arranged to cooperate with similar clutch teeth 19 on the driven clutch member 16. A sleeve 21 is arranged

2 to surround the control nut 17 and driven clutch member 16 and limit the separation thereof. For this purpose one end of the sleeve is pressed into a groove 22 in the control nut 17, and the opposite end is provided with an inturned flange 23 adapted to engage a shoulder 24 on the driven clutch member 16 but normally spaced therefrom sufficiently to permit disengagement of the clutch teeth 18, 19. A spring 25 is located within the sleeve 21 bearing at one end against the flange 23 of the sleeve, and at its other end against a shoulder 26 on the clutch member.

The extended hub 15 of pinion 13 is provided with a radial opening 27, and the driven clutch member 16 has an opening 28 arranged to slidably receive a detent member here shown in the form of a ball 29 which is pressed against the reduced portion 2 of the power shaft by a spring 31. The ball and spring are preferably retained by means of a tubular thimble 32 having a press fit within the passage formed by the openings 27, 28 and constricted as shown at 33 to prevent escape of the detent ball.

The primary function of the detent 29 is to delay the demeshing movement of the pinion when the engine starts in order to assure that the engine is reliably self operative before the pinion becomes demeshed from the engine gear. It has been found practical to secure satisfactory operation of the detent on a smooth power shaft, but when it is desired to enhance the retarding action of the detent an annular groove 34 is formed in the reduced portion 2 of the power shaft in position to be engaged by the detent when it starts its demeshing movement.

Detent 29 is also preferably employed to prevent drifting of the pinion and its associated parts away from idle position during the operation of the engine by reason of vibration or other cause. For this purpose, a groove 35 having an inclined shoulder 36 is formed in the reduced portion 2 of the power shaft in such position that the detent is forced to ride up the shoulder 36 during the initial meshing movement of the drive, so as to yieldingly oppose such movement.

In operation, starting with the parts in the positions illustrated in Fig. 1, rotation of the power shaft in the direction of the arrow (a) is transmitted through the drive head 5 and barrel 7 to the screw shaft 4, whereby the control nut 17, clutch member 16, and pinion 13 are traversed to the right until the pinion meshes with the engine gear 14, the meshing position being defined preferably by one or more thrust washers 37 seated against the shoulder 3 of the power shaft 1. As soon as the longitudinal movement of the pinion is thereby arrested, torque is built up to rotate the pinion, while the clutch teeth 18, 19 are tightly clamped together by the screw-jack action of the screw shaft 4 and nut 17, the longitudinal movement of the screw shaft in a backward direction being cushioned by the spring washers 11.

When the engine starts, the acceleration of the pinion 13 causes the control nut 17 to back away sufficiently to permit the clutch teeth 18, 19 to overrun. Thereafter, the pinion 13 can overrun freely, its longitudinal movement away from the gear 14 being frictionally opposed by detent 29 as it bears on the power shaft. If the engine does not remain self-operative after the first few explosions, the pinion 13 slows down and thereby retards the control nut 17 by virtue of the friction between these members engendered by the clutch spring 25. Control nut 17 is thereby again traversed to the right and cranking is resumed. When the engine becomes self-operative and rotates above a predetermined speed, the centrifugal force acting on the detent 29 causes it to move outwardly, compressing the spring 31, thus permitting demeshing of the pinion to take place and the parts to return to their idle positions.

Although but one embodiment of the invention has been shown and described in detail, it will be understood other embodiments are possible and changes may be made in the design and arrangement of the parts without departing from the spirit of the invention.

I claim:

1. In an engine starter drive a power shaft, a hollow screw shaft slidably journaled thereon, means connecting the screw shaft to rotate with the power shaft and limiting its longitudinal movement thereon, a control nut threaded on the screw shaft, a pinion slidably journaled on the power shaft for movement into and out of mesh with a gear of an engine to be started, said power shaft having an abutment thereon limiting the meshing movement of the pinion, means connecting the control nut to the pinion including an overrunning clutch, and a centrifugal detent mounted on the pinion frictionally engaging the power shaft.

2. An engine starter drive as set forth in claim 1 in which the overrunning clutch is of the dental type, clamped closed during cranking, by the screw-jack action of the screw shaft and nut, forcing the pinion against said abutment on the power shaft.

3. An engine starter drive as set forth in claim 1 in which the pinion is provided with an extended hub having a radial opening, and the centrifugal detent is slidably mounted in said opening, and including a spring yieldably pressing the detent against the power shaft.

4. An engine starter drive comprising a power shaft, a hollow screw shaft slidably journaled thereon, means connecting the screw shaft to rotate with the power shaft and yieldably limiting its longitudinal movement thereon, a control nut threaded on the screw shaft having overrunning clutch teeth formed thereon, a pinion slidably journaled on the power shaft for longitudinal movement into and out of mesh with a gear of an engine to be started, said power shaft having an abutment defining the meshed position of the pinion, said pinion having an extended hub, a driven clutch member fixedly mounted on said hub, having clutch teeth cooperating with the teeth on the control nut, a sleeve surrounding and limiting the separation of the control nut and driven clutch member, permitting disengagement of the clutch teeth; and a spring in the sleeve urging the control nut and driven clutch member into clutching engagement.

5. An engine starter drive as set forth in claim 4, in which the pinion hub and driven clutch member are provided with registering openings forming a radial passage and including further a detent member slidably mounted in said passage, and a spring pressing the detent into frictional engagement with the power shaft.

JAMES J. DIGBY.

REFERENCES CITED

The following references are of record in the file of this patent:

UNITED STATES PATENTS

| Number | Name | Date |
|---|---|---|
| 1,210,028 | Adams | Dec. 26, 1916 |
| 2,348,063 | FitzGerald | May 2, 1944 |